United States Patent [19]

Mohrfeld

[11] Patent Number: 4,815,700
[45] Date of Patent: Mar. 28, 1989

[54] BALL VALVE WITH IMPROVED SEALS

[76] Inventor: James W. Mohrfeld, 5522 Sheraton Oak Dr., Houston, Tex. 77091

[21] Appl. No.: 172,429

[22] Filed: Mar. 24, 1988

[51] Int. Cl.$^4$ ............................................. F16K 25/00
[52] U.S. Cl. ................................... 251/172; 251/175
[58] Field of Search ............... 251/172, 159, 171, 174, 251/175, 315

[56] References Cited

U.S. PATENT DOCUMENTS

| | | | |
|---|---|---|---|
| 3,082,992 | 3/1963 | Vichery | 251/172 |
| 3,100,499 | 8/1963 | Bass | 251/315 X |
| 3,401,914 | 9/1968 | Shand | 251/315 X |
| 3,520,512 | 7/1970 | Huber | 251/315 X |
| 3,721,425 | 3/1973 | Jones et al. | |
| 3,752,178 | 8/1973 | Grove et al. | |
| 3,841,347 | 10/1974 | Kushida | 251/172 X |
| 4,147,327 | 4/1979 | Moran | |
| 4,273,309 | 6/1981 | Morrison | |
| 4,353,525 | 10/1982 | DiDomizio, Jr. | |
| 4,386,756 | 6/1983 | Muchow | |
| 4,502,663 | 3/1985 | Huber | |

Primary Examiner—A. Michael Chambers
Assistant Examiner—John C. Fox
Attorney, Agent, or Firm—Browning, Bushman, Zamecki & Anderson

[57] ABSTRACT

A ball valve of the floating ball variety is provided. Improved sealing subassemblies each comprising a floating seat retainer and a corresponding flexible metallic seat ring provide reliable sealing engagement with both upstream and downstream surfaces of the ball. Each seat retainer moves with the floating ball to maintain annular contact therewith, and retains its corresponding seat ring in constant concentricity with the ball. The seat ring is sealed against the ball by line pressure acting directly on the seat ring on the upstream side, and by line pressure acting on the ball on the downstream side to transmit movement to the seat retainer which then causes the seat ring to perfect a seal against the ball. Each of the seat rings and seat retainers thus independently floats with respect to the valve body. The same sealing subassemblies are utilized on both the upstream and downstream sides of the valve, allowing any side of the valve to be used in any location and making the valve highly versatile. The metallic seat rings are continually in contact with the ball, thereby rendering the valve particularly suitable for handling abrasive fluids.

17 Claims, 3 Drawing Sheets

BALL VALVE WITH IMPROVED SEALS

FIELD OF THE INVENTION

The present invention relates to ball valves which use a ball (sphere) that floats with respect to the valve body. These valves are commonly referred to as floating ball valves. This invention relates a floating ball valve with improved sealing subassemblies for reliably sealing the ball on both the upstream and downstream sides of the valve. This valve is particularly well suited for handling abrasive and/or corrosive fluids, such as sand and mineral-laden oil and gas well fluids.

BACKGROUND OF THE INVENTION

Two-way ball valves are well known in the art, and have long been used to control fluid flow from a source (upstream) to a destination (downstream). Multiple port valves (three or four way) similarly control fluid flow from a source to one or more destinations depending on the type of valve (three or four way; "T" or "L" shaped ports through the ball). A typical diverter ball valve would have three ports, one upstream and two downstream. A diverter ball valve would thus have two operating positions: a first position would direct fluid from a source to one downstream port, and the second position would direct the fluid from the source to the other downstream port. The upstream port would be open in both positions, and one of the two downstream ports would be open and the other closed depending on the operating position. An annular sealing subassembly is typically provided about each port.

Ball valves are generally classified as either of the trunnion-mounted variety or the floating ball variety. Trunnion-mounted ball valves seal primarily on the upstream seat, whereas floating ball valves seal primarily on the downstream seat. Valve sealing effectiveness is generally a direct function of sealing forces: the higher the forces, the better the seal. Trunnion-mounted ball valves typically have lower operating torque and thus poorer sealing effectiveness than a floating ball valve. Floating ball valves are thus often preferred because they generally perfect a better seal than trunnion-mounted ball valves, although they normally do require a higher operating torque.

In a trunnion-mounted ball valve, the ball either may be physically joined to, or may be an integral part of, a trunnion which extends from the top and bottom of the ball. In either case, the trunnions (stems) are retained by the valve body and define the axis on which the ball is rotated. A typical trunnion-mounted ball valve is disclosed in U.S. Pat. No. 3,732,885. Force on the ball generated by line pressure is retained by the trunnions acting against the valve body. Both the upstream and downstream seats are typically energized with a biasing force against the ball, using substantial biasing pressure generated by a spring or similar device. As the valve is required to seal against higher line pressures, additional upstream seat force against the ball is created. For all practical purposes, most trunnion-mounted ball valves effectively seal at high pressure only on the upstream side of the ball. An example of a sealing subassembly for trunnion-mounted ball valves is disclosed in U.S. Pat. No. 4,147,327.

Trunnion-mounted ball valve seats are thus generally retained in position by the valve body, are preloaded with a spring force to maintain sealing engagement with the ball, perfect a low pressure seal, and assist the line forces in high pressure upstream sealing. These seats are typically metallic or a combination of metallic and nonmetallic elements. Trunnion-mounted ball valves with metallic seating rings are disclosed in U.S. Pat. Nos. 4,262,688; 4,318,420 and 4,386,756. U.S. Pat. No. 4,519,412 discloses a trunnion-mounted ball valve with a sealing subassembly adapted to receive a sealant should a leak occur. Trunnion-mounted ball valves having a seat ring including an elastomeric material for perfecting the seal against the ball are disclosed in U.S. Pat. Nos. 3,752,178 and 4,273,309. Special tools are typically required to install and replace seats in a top entry trunnion-mounted ball valve.

Floating ball valves have a ball that is free to float in any direction with respect to the body. The ball is typically restrained only by the seats. The ball is forced against the downstream seats by line pressure when in the closed position. Depending on the nature of the valve, the upstream seat may float against the ball in a manner similar to a trunnion-mounted ball valve. Alternately, the upstream seat may be in a permanent position with respect to the valve body, in which case it separates from the ball as the ball moves downstream to seal. Sealing the third or fourth ports of a floating ball valve presents additional difficulties, since the ball motion is now not limited to linear movement between a single upstream port and a single downstream port.

Although the dimensional movement of the ball in a floating ball valve is minimal, this movement is critical and essential to the proper sealing of the valve. The line pressure creates a substantial force on the ball that is proportional to the bore size (actually the effective seat sealing diameter) of the valve. This substantial sealing force is not available in a trunnion-mounted ball valve because the ball is rigidly mounted by the trunnions.

To perfect an effective seal, floating ball valve seats are typically fabricated from an elastomeric material and are preloaded with a force against the ball both upstream and downstream. A floating ball valve with elastomeric seats is disclosed in U.S. Pat. No. 3,721,425. A "free floating" elastomeric seal is disclosed in U.S. Pat. No. 4,535,525, and a temperature sensitive valve body/seat seal is disclosed in U.S. Pat. No. 4,658,847. A floating ball valve with a deformable thin walled sheet metal seal is presented in U.S. Pat. No. 4,502,663.

Ball valves with elastomeric seats generally do not provide long life service when subjected to erosive fluids. Rigidly mounted metallic seats in either a trunnion-mounted or floating ball valve may provide increased life compared to elastomeric seats, and are frequently specified by valve users. Rigid metallic seats in conventional floating ball valves encounter significant problems, however, when used in an abrasive environment, such as oil and gas well fluids having sand and hard minerals entrained therein. When a sand grain or other hard foreign particle gets trapped between the ball and seat, the seat is forced away from the ball so that the separation of the ball and the seat allows the valve to leak. Equally important, at this time the rigid seat supports the ball at only two points, one where the foreign matter is trapped and the other directly across the seat from this point (180° apart). This localized force on the rigid seat is extremely high, and in almost all cases will deform the seat and/or the ball (gauld one or both surfaces), thereby creating a permanent leak and causing valve failure.

U.S. Pat. No. 4,326,752 discloses one effort to increase the life of a trunnion-mounted ball valve by incorporating a metal scraper ring as part of the seat assembly. The metal ring removes scale and foreign matter from the ball and protects the elastomeric seal from abrasion. A problem with this design is that the wiper seal will wear quickly when operating in a bath of abrasive fluids because of its small cross section and high localized forces against the ball. Once the wiper seal has worn, its effectiveness is diminished and foreign matter will abrade the seat and ball, and the valve will no longer seal.

Those skilled in the art have also recognized that the manufacturing costs of ball valves is inherently related to the required machining accuracy of the valve seat components, and that the overall operating cost of the valve is a function of the time and expense associated with repairing the valve, as described in U.S. Pat. No. 4,441,524. Nevertheless, prior art ball valves have failed to satisfy customer needs for many applications, particularly when handling abrasive fluids.

The disadvantages of prior art ball valves, both trunnion-mounted and floating ball types, have caused some users to specify poppet-type valves. In the poppet-type valve, the seat sealing surface are typically exposed to the flow stream at all times, and are thus subject to abrasion and yield a short service life. Poppet valves also have restricted ports, with the fluid being forced to flow around a complex geometry including the poppet piston itself. This flow arrangement causes two major problems: one, there is substantial restriction to the flow across the valve, and two, the combination of a turning flow stream and the reduced port size results in excessive erosion to the valve body and internal parts.

The disadvantages of the prior art are overcome by the present invention, and an improved ball valve is hereinafter disclosed which offers substantially increased service life over prior art valves when handling abrasive and corrosive fluids.

SUMMARY OF THE INVENTION

A ball valve is provided utilizing a ball which floats with respect to the valve body and which is provided with improved sealing subassemblies. Each sealing subassembly comprises a floating metal seat retainer which maintains concentricity with the ball. The downstream seat retainer absorbs the forces on the ball generated by the line pressure, thereby limiting the seat ring to its intended sealing function. The annular seat ring of each subassembly is fabricated from a flexible thin metallic sheet, and maintains sealing engagement with the ball at all times. Since each seat ring is constantly against the ball during valve operation, it is designed to be a wear component, and provides sealing service throughout its wear life.

In a three way or diverter ball valve, four ring-like sealing assemblies are provided, with one sealing assembly functioning as a downstream sealing assembly, and three sealing assemblies reacting as upstream sealing assemblies. The downstream flexible metallic ring is sealed against the ball by line pressure which forces the ball against the seat retainer. The seat retainer, in turn, forces a radially external portion of the metallic seat ring against the body end piece, and a radially internal portion of the seat ring against the ball. In this action, the radially internal portion of the seat ring is forced into elastic deformation, thereby perfecting a metallic seal against the ball. For the upstream sealing assemblies, each identical seat ring is forced against the ball to perfect a seal directly by line pressure and the biasing force of an elastomeric O-ring.

Each seat ring maintains continual contact with the ball, thereby not allowing mineral deposits or sand to become imbedded between the ball and seat ring. The seat ring constantly wipes the ball, scraping off foreign matter and relapping the sealing surfaces with the ball. Preferably, all upstream and downstream sealing subassemblies of this valve are identical. This feature allows the valve to be operated in any position, which greatly enhances the flexibility of the valve and substantially reduces repair costs by simplifying replacement procedures and reducing inventory.

Each thin-wall seat ring is positioned between the valve body end piece and a respective seat retainer. An O-ring is provided between the floating seat ring and the body end piece to provide a seal between these components and to produce a light force which keeps the seats engaged with the ball at all times. The mating seat retainer and body end piece surfaces are preferably tapered slightly toward the ball to increase sealing effectiveness between the ball and seat ring. The seat ring has a preselected thickness to generate the most effective force for sealing the valve at the rated operating pressure of the valve. With the seat retainer handling the forces on the downstream side of the ball, the seat rings are utilizing forces generated only by line pressure and/or the nominal biasing force of the O-ring for sealing the valve. Consequently, seat wear and operating torque are limited and proportional to line pressure.

The features of the present invention result in an improved floating ball valve which is well adapted for handling various gas or liquid materials. The ball valve is particularly suitable for controlling the flow of abrasive, erosive, and/or corrosive fluids, such as wellhead fluids including sand and hard minerals. Metal-to-metal sealing engagement between the ball and the seat ring produces long service life, and each of the seat rings maintain contact with the ball during valve operation to further enhance valve life. The valve is highly versatile since the same seat geometry can be employed for all ports, and the valve may thus be mounted in any desired position. The valve is also easily disassembled using one wrench, and does not require special tools for reassembly.

These and further features and advantages of the present invention will become apparent from the following detailed description, where reference is made to the figures in the accompanying drawings.

DETAILED DESCRIPTION OF PREFERRED EMBODIMENTS

Figure 1:
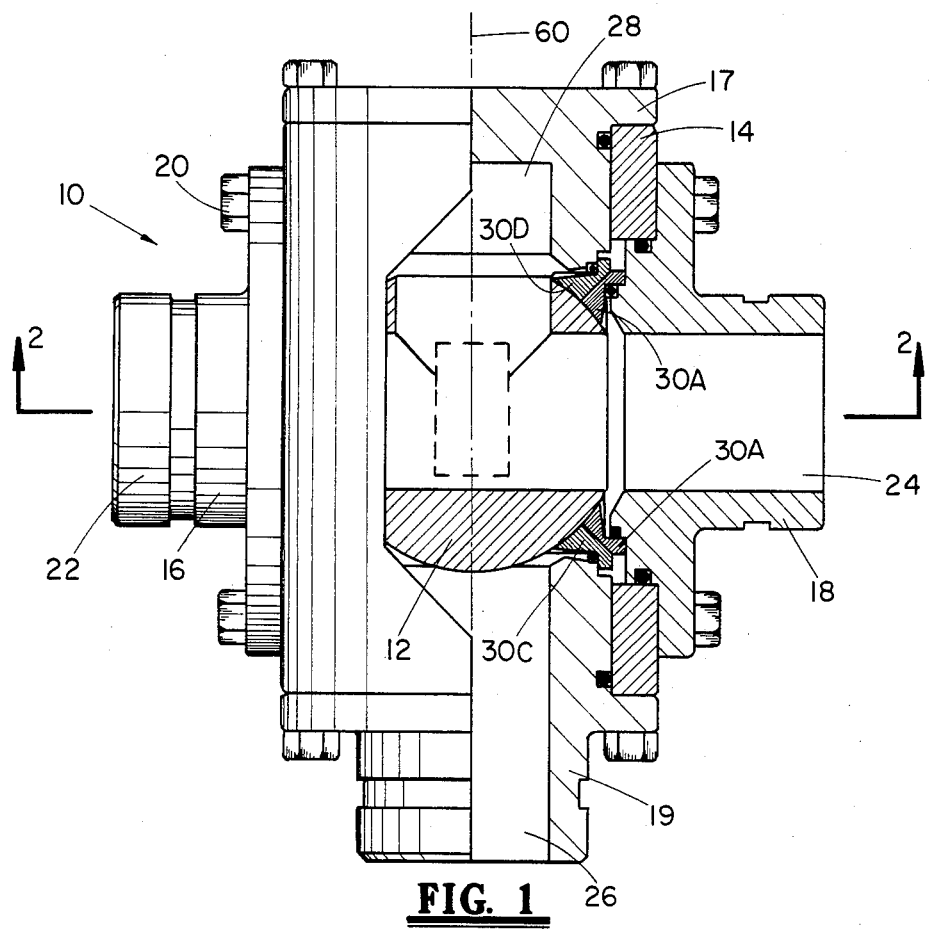
FIG. 1 is a simplified pictorial view, partially in cross section, of a suitable floating ball valve according to the present invention.

A three way ball valve 10 according to the present invention is generally depicted in FIG. 1, comprising a sphere member or ball 12 having a straight through passageway and a right angle passageway ("T"-shaped ports). The valve body comprises a center or casing section 14, a pair of identical body end pieces 16, 18, and oppositely positioned end pieces 17, 19, each removably secured to the center section 14 by conventional cap screws 20.

The three way or diverter valve 10 includes an inlet port and two output ports, so that fluid may be selectively directed from the incoming fluid line (not shown) to a selected output port, depending on a position of the ball 12 within the valve body. For purposes of illustration, FIG. 1 assumes that port 22 is the inlet port (and thus defines the upstream side of the valve), port 24 is the normal downstream open port, and port 26 is the normal downstream closed port or "side port". In the three way valve shown in FIG. 1, the fourth port (opposite 26) is continually blocked by end section 17. In a four way ball valve having a ball with an "L" passageway, this port could be similar to port 26.

Each of the four ports shown in FIG. 1 is provided with an annular sealing assembly 30 described in detail below. For the present, however, it should be understood that each of the four sealing assemblies 30 seals between its respective end piece and the ball 12. With respect to FIG. 1, sealing assembly 30A may be understood as the fluid-diverted downstream seal, since the ball may be rotated in counterclockwise direction 90° from that shown, and line pressure on the ball would push the ball toward the downstream sealing assembly 30A. Sealing assembly 30B adjacent port 22 will always be an upstream seal, since line pressure will not move the floating ball toward this sealing assembly. With the ball in the position shown in FIG. 1, sealing assembly 30C is acting as a downstream seal since line pressure is pressing the ball in that direction, and sealing assembly 30A is acting as an upstream seal since line pressure will not produce a significant force on the ball in the direction of port 24. Finally, sealing assembly 30D for sealing the "blind side" of the valve will act as an upstream seal, since line pressure will not force the ball sealing assembly 30D in any of the three positions of the ball. In summary, three of the four sealing assemblies of the three way ball valve shown in FIGS. 1 and 2 will act as upstream sealing assemblies, with the one downstream sealing assembly being 30A or 30C, depending on the rotational position of the ball.

Figure 2:
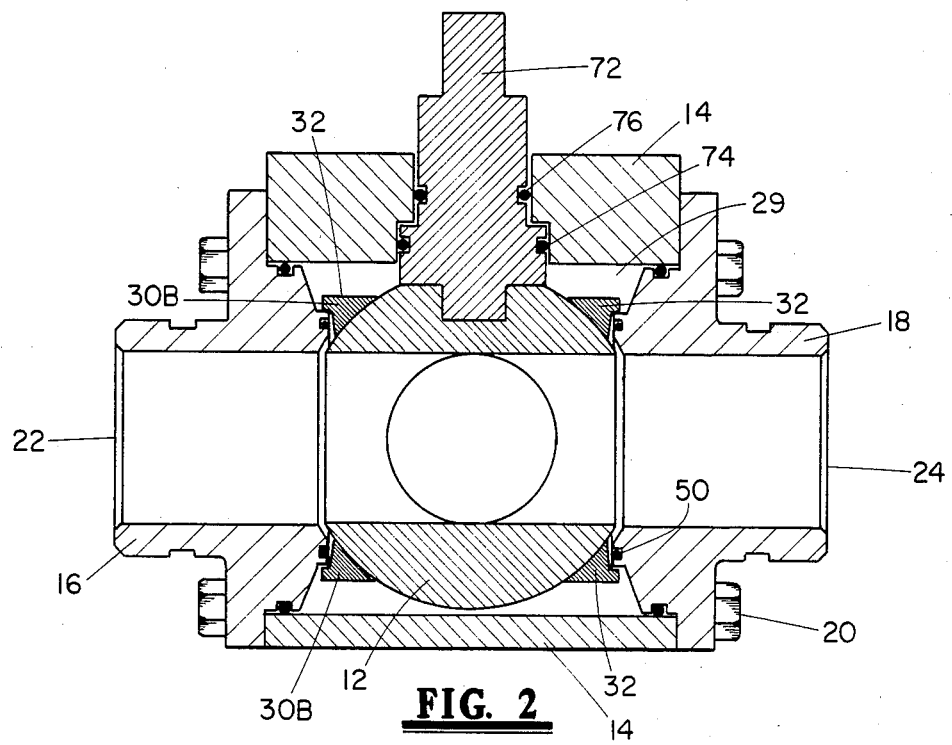
FIG. 2 is a simplified cross-sectional view of the ball valve shown in FIG. 1.
Figure 3:
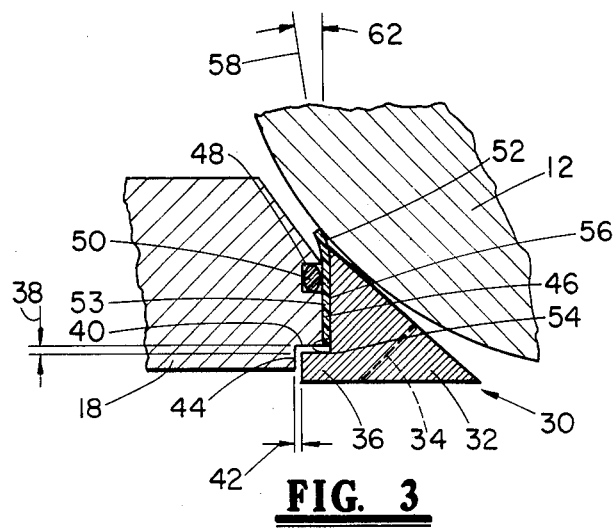
FIG. 3 is a cross-sectional view of a downstream sealing subassembly according to the present invention in sealed engagement with a ball.
Figure 4:
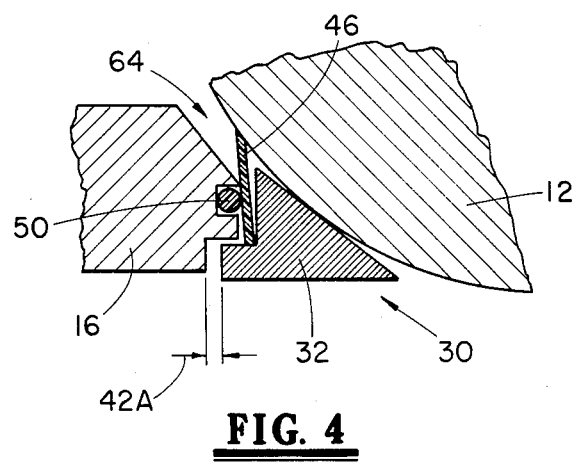
FIG. 4 is a cross-sectional view of an upstream sealing subassembly according to the present invention in sealed engagement with a ball.

At radially opposite points, each of the four sealing assemblies, when mounted in the valve body, comes close to engagement with another sealing assembly. Referring briefly to FIGS. 1 and 3, the end sections of each retaining ring 32 at these radially opposite points may thus be cut off substantially along the line 34, so that the installed retaining rings are not physically in engagement when mounted within the valve, but rather are separated by a thin gap. Other than the removal of a portion of the retaining ring as described above, the cross-section of each ring-like seat retainer assembly is illustrated in FIGS. 2-4, with FIG. 3 illustrating the sealing assembly for a downstream seal with the ball, and FIG. 4 illustrating the sealing assembly for one of the upstream seals with the ball. As previously stated, however, each of the sealing assemblies is preferably identical, and any of the open ports 22, 24, 26 may selectively serve as the upstream, downstream, or side port, depending on the desired installation.

FIG. 2 is a cross-sectional view of the valve shown in FIG. 1 along line 2—2. The upstream port 22 and downstream port 24 are formed by respective conventional valve body end pieces 16, 18, respectively. Ball 12 is rotated in a conventional manner through stem 72, which is sealed with the valve body with conventional seals 74, 76. With the valve in its fully closed position, its open port 24-closed port 26 position, or its closed port 24-open port 26 position, the four ring-like sealing assemblies effectively seal the cavity 29 from the flow of fluid through the valve. A powered valve operator or handle (not shown) would normally be provided for rotating the stem 72.

Referring now to FIG. 3, the ring-like seat retainer 32 has a generally triangular cross-sectional configuration, with an outer annular lip 36 acting to limit movement of the retainer in the valve body. The ring member 32 may free float, however, with respect to the valve body 14, thereby moving in any direction to maintain concentricity or alignment with the ball. With respect to the fixed end piece 18, a gap or clearance 38 exists between the annular lip 36 and surface 40 of each piece 18, while another gap 42 is provided between the lip 36 and surface 44.

On the downstream side as shown in FIG. 3, the thin-walled metallic seat ring 46 is sandwiched between the end piece 18 and retainer ring 32. A circular cavity 48 having a rectangular cross section is provided in the end piece 18, and houses an elastomeric O-ring 50 which seals between 18 and 46, as shown. Substantially all of the differential line pressure force acting on the ball, which is typically a significant force in the range of from 25 psi to 600 psi, is contained by the seat retainer 32 of the downstream sealing assembly 30. In other words, the line pressure force on the ball is transmitted to retaining ring 32 and thence to the valve body, with the seat ring 46 merely being in compression. The end 52 of seat ring 46 projecting radially inward of retaining ring 32 is not sandwiched between 18 and 32, and is thus free to flex upon engagement with the ball to provide a reliable metal-to-metal seal therewith. Most importantly, the end 52 resists minimum line pressure force acting on the ball, since substantially all of this force is absorbed by the retainer 32, which provides no sealing function.

To insure the sealing effectiveness of radially inward portion 52 when on the downstream side of the valve, the substantially parallel surfaces 54 on end piece 18 and 56 on retaining ring 32, each in planar engagement with seat ring 46, are preferably frustro-conical surfaces tapered slightly inwardly toward the ball's center, as shown. With respect to reference line 58 which is parallel to center line 60 shown in FIG. 1, each of the surfaces 54, 56 is thus tapered inwardly at an angle 62 in the range of from 2° to 10°, and preferably from 3° to 7°. This feature results in the radially interior end 52 of seat ring 46, when on the downstream side, purposefully being flexed slightly toward the center of the ball by the line pressure force on the ball acting on the seat retainer 32. The radially outward portion 53 of the seat ring 46 is sandwiched and effectively fixed at this time between the end piece 18 and the retaining ring 32, so that its radially inward free end 56 is thereby flexed toward the ball's center. As shown in FIG. 3, however, the ball 12 then flexes this free end 52 in an opposite direction away from the center of the ball. This flexing action by the ball significantly increases the sealing effectiveness between the seat ring 46 and the ball. Accordingly, it should be understood that line pressure force acting on the downstream seat retainer assists in the sealing effectiveness of the seat ring, although only a small portion of this same line pressure force is contained or opposed by the seat ring.

On the upstream side as shown in FIG. 4, the ball 12 will typically be slightly further away from its end piece than would be the case on the downstream side, since the ball freely floats in response to line pressure force. Nevertheless, the seat retainer 32 also floats to maintain alignment with the ball, and is pressed into continued engagement with the ball by line pressure. On the upstream side, the seat ring 46 will remain substantially in a single plane, since end 52 is not drastically bent as shown in FIG. 3, and since the frustroconical surfaces 54, 56 do not sandwich the seat retainer toward engagement with the ball.

The O-ring 50 engages the outer face of the seat ring 46 and biases the seat ring into engagement with retainer 32, and into engagement with the ball 12. Gap 42A is thus greater than the gap 42 shown in FIG. 3, because the floating ball is pushed by line pressure into and away from end piece 16 and toward end piece 18. On the upstream side, line pressure in gap 64 biases the seat ring 46 into engagement with the ball. This biasing action is assisted by the force of O-ring 50 acting on the seat ring 46, although the biasing force of 50 will typically be less than the force resulting from line pressure. The seat ring 46 will thus be maintained in sealed engagement with the ball when on the upstream side of the valve due to line pressure forces acting directly on the seat ring and thereby biasing the seat ring and seat retainer toward engagement with the ball.

With the ball in the position as shown in FIG. 1, sealing assembly 30C is acting as the sealing assembly for the downstream port, since the ball 12 will be moved by line pressure toward port 26 and away from end piecd 17. The seat retainer for sealing assembly 30D adjacent cavity 28 will thus be positioned with respect to the ball as shown in FIG. 4. Sealing assemblies 30A and 30B will act substantially as sealing assemblies for an upstream port, since the ball 12 will not be forced by line pressure toward either port 24 or port 26 (pressure differential across the valve may result in a slight force moving the ball toward port 24, but this force is nominal compared to the line pressure force pressing the ball toward port 26). Accordingly, it should be understood that the retaining ring for each sealing assembly 30A, 30B when the ball is positioned as shown in FIG. 1 may typically be slightly closer to its respective end piece 18, 16 than the relationship depicted in FIG. 4. Nevertheless, the sealing assemblies 30A and 30B will seal with the ball in a manner similar to the upstream sealing assembly 30D, which sealing assembly 30C is sealing with the ball in the position shown as a downstream sealing assembly According to the present invention, the seat rings of all four sealing assemblies will remain in sealing engagement with the ball 12, as described herein, regardless of the rotational position of the ball, and regardless of which port is acting as the downstream port.

The material and thickness of seat ring 46 may be selected to maximize sealing effectiveness when on the downstream side of the valve, taking into consideration machining the tolerances of the components and anticipated or rated line pressure for the valve. A seat ring of sheet spring steel material with a thickness of 0.020 inches would be suitable for a ball valve with a rating of 400 psig. A thicker sheet material for the seat ring would be preferred for a valve handling higher line pressure, since deformation of more cross-sectional area would produce a higher sealing force against the ball when on the downstream side to seal therewith.

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A floating ball valve including a valve body having a plurality of ports, a ball having a flow passage therethrough and being rotatably mounted within a cavity in the valve body for controlling flow of fluid under line pressure through the valve, at least one of the plurality of ports being an upstream port open to line pressure by selective rotation of the ball, the ball being movably positioned within the cavity with respect to the valve body in response to line pressure toward the downstream port, and another of the plurality of ports being a downstream port closed to line pressure by selective rotation of the ball, and a plurality of sealing assemblies each positioned adjacent a respective one of the ports for sealing engagement between the valve body and the ball, each of the sealing assemblies comprising:

an annular floating seat retainer means movably mounted within the cavity between the valve body and the ball for maintaining concentricity with the movable ball, the seat retainer means when adjacent the upstream port movable by line pressure away from the upstream port and into contact with the movable ball, and when adjacent the downstream port being movable toward the downstream port by line pressure acting on the ball and transmitting substantially all line pressure force acting on the ball to the valve body;

an annular sheet-like floating flexible metal seat ring means movably positioned between the seat retainer means and the valve body for sealing engagement with the ball, the seat ring means having an annular radially inward portion and an annular radially outward portion, the seat ring means when adjacent the upstream port movable so that its radially inward portion is forced by line pressure into engagement with the ball, and when adjacent the downstream port having its radially outward portion in engagement with and sandwiched between a planar surface on the valve body and a corresponding planar surface on the seat retainer means, such that its radially inward portion is substantially deflected toward the downstream port by engagement with the ball as its radially outward portion is sandwiched between the seat retainer means and valve body; and an annular compressible sealing means between the valve body and the seat ring means for sealing therebetween and for biasing the seat ring means toward engagement with the ball.

2. The floating ball valve as defined in claim 1, wherein:

the planar surface on the valve body being tapered at a selected angle radially inward toward a center of the ball; and the corresponding surface on the seat retainer means being tapered at approximately the same selected angle radially inward toward the center of the ball, such that the metal seat ring means is flexed so that its radially inward portion is directed toward the ball as its radially outward portion is sandwiched between the tapered surfaces of the valve body and the seat retainer means.

3. The floating ball valve as defined in claim 2, wherein the taper of the planar surface on the valve body is in the range of from 2° to 10°.

4. The floating ball valve as defined in claim 1, wherein the metal ring means is formed from a material having a selected flexibility, and the metal ring means has a preselected thickness as a function of its selected flexibility.

5. The floating ball valve as defined in claim 1, wherein each of the sealing assemblies are structurally identical.

6. The floating ball valve as defined in claim 1, wherein the passage through the ball has a T-shaped configuration.

7. The floating ball valve as defined in claim 1, wherein the seat retainer means in cross section has a substantially triangular configuration with its hypotenuse side in engagement with the ball.

8. The floating ball valve as defined in claim 7, wherein the seat retainer means has a radially outward annular lip for limiting radial movement of the seat retainer means with respect to the valve body.

9. The floating ball valve as defined in claim 1, further comprising:
the valve body including an end piece positioned about each of the plurality of ports and including the planar surface of the valve body;
each of the end pieces including a circular groove adjoining its planar surface; and
the compressible sealing means is an O-ring seal housed in its respective circular groove.

10. In a floating ball valve including a valve body having an inlet port and a pair of outlet ports, a ball having a T-shaped flow passageway therethrough and being rotatably mounted within a cavity in the valve body for controlling the flow of fluid under line pressure from the inlet port to a selected one of the pair of outlet ports, a first of the pair of outlet ports being an upstream port open to line pressure by selective rotation of the ball, a second of the pair of outlet ports being a downstream port closed to line pressure by selective rotation of the ball, the ball being movable within the cavity toward the first outlet port in response to line pressure to the valve, and a corresponding pair of sealing assemblies each positioned adjacent a respective one of the pair of outlet ports for sealing engagement between the valve body and the ball, the improvement comprising:
each of the sealing assemblies including (a) an annular floating seat retainer means movably mounted within the cavity between the valve body and the ball for maintaining concentricity with the movable ball, (b) an annular sheet-like floating flexible metal seat ring means movably positioned between the seat retainer means and the valve body for sealing engagement with the ball, the seat ring means having an annular radially inward portion and an annular radially outward portion, and (c) an elastomeric-material sealing means between the valve body and the seat ring means for sealing therebetween and for biasing the seat ring means toward engagement with the ball;
the seat retainer means adjacent the first port movable by line pressure into contact with the movable ball;
the seat retainer means adjacent the second port movable by line pressure acting on the ball toward the second port and transmitting substantially all line pressure force acting on the ball to the valve body;
the seat ring means adjacent the first port movable so that its radially inward portion is forced by line pressure into engagement with the ball and its radially outward portion is in engagement with the seat retainer means; and;
the seat ring means adjacent the second port having its radially outward portion in engagement with and sandwiched between a planar surface of the valve body and a corresponding planar surface of the seat retainer means, such that its radially inward portion is substantially deflected toward the second port by engagement with the ball as its radially outward portion is sandwiched between the seat retainer means and the valve body.

11. The improvement as defined in claim 10, wherein:
the planar surface on the valve body being tapered at an angle of from 2° to 10° radially inward toward a center of the ball; and
the corresponding surface from the seat retainer means being tapered at approximately the same angle radially inward toward the center of the ball such that the metal seat ring means adjacent the second port is flexed so that its radially inward portion is directed toward the ball when its radially outward portion is sandwiched between the tapered surfaces of the valve body and the seat retainer.

12. The improvement as defined in claim 10, wherein the sealing assemblies adjacent each of the first and second ports are structurally identical.

13. A method of sealing a valve body having a plurality of ports with a ball having a flow passageway therethrough and being rotatably positioned within a cavity in the valve body for controlling flow of fluid under line pressure through the valve, at least one of the plurality of ports being an upstream port open to line pressure by selective rotation of the ball, and another of the plurality of ports being a downstream port closed to line pressure by selective rotation of the ball, the ball being movably positioned within the cavity with respect to the valve body in response to line pressure toward the downstream port, the method comprising:
movably mounting an annular floating seat retainer within the cavity between the valve body and the ball and about each of the plurality o ports, each of the seat retainer means when adjacent the upstream port being moved by line pressure away from the upstream port and into contact with the movable ball, and when adjacent the downstream port being moved toward the downstream port by line pressure acting on the ball and transmitting substantially all line pressure force on the ball to the valve body;
movably mounting an annular sheet-like floating flexible metal seat ring between each of the seat retainers and the valve body for sealing engagement with the ball, each of the seat rings having an annular radially inward portion and an annular radially outward portion, the seat ring when adjacent the upstream port being moved by line pressure so that its radially inward portion is forced into engagement with the ball and its radially outward portion is in engagement with the seat retainer, and when adjacent the downstream port having its radially outward portion in engagement with and sandwiched between a planar surface of the valve body and a corresponding planar surface of the seat retainer, such that its radially inward portion is substantially deflected toward the downstream port by engagement of the ball as its radially outward portion is sandwiched between the seat retainer and the valve body; and positioning an annular compressible seal between the valve body and each seat ring for sealing therebetween and for biasing its respective seat ring toward engagement with the ball.

14. The method as defined in claim 13, further comprising:

forming the planar surface on the valve body tapered at a selected angle radially inward toward a center of the ball; and forming the corresponding surface on the seat retainer tapered at approximately the same selected angle radially inward toward the center of the ball, such that the metal seat ring is flexed so that its radially inward portion is directed toward the ball when the radially outward portion is sandwiched between the tapered surfaces of the valve body and the seat retainer.

15. The method as defined in claim 14, wherein the selected taper of the planar surface is from the range of from 2° to 10°.

16. The method as defined in claim 13, further comprising:

selecting the sheet-like floating flexible metal ring of a thickness as a function of the anticipated line pressure to the valve.

17. The method as defined in claim 13, further comprising:

utilizing substantially identical seals for sealing the valve and the ball adjacent both the upstream port and the downstream port.

* * * * *